United States Patent
Chung

(10) Patent No.: US 11,358,524 B2
(45) Date of Patent: Jun. 14, 2022

(54) LAMP FOR AUTOMOBILE AND AUTOMOBILE INCLUDING THE SAME

(71) Applicant: HYUNDAI MOBIS CO., LTD., Seoul (KR)

(72) Inventor: Dae Won Chung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/463,375

(22) Filed: Aug. 31, 2021

(65) Prior Publication Data
US 2022/0080883 A1   Mar. 17, 2022

(30) Foreign Application Priority Data

Sep. 15, 2020   (KR) .................. 10-2020-0118636

(51) Int. Cl.
*B60Q 3/66*   (2017.01)
*F21V 8/00*   (2006.01)
*B60Q 3/62*   (2017.01)

(52) U.S. Cl.
CPC .............. *B60Q 3/66* (2017.02); *B60Q 3/62* (2017.02); *G02B 6/0006* (2013.01)

(58) Field of Classification Search
CPC ........... B60Q 3/66; B60Q 3/62; G02B 6/0006
USPC ........................................................ 362/511
See application file for complete search history.

(56) References Cited

U.S. PATENT DOCUMENTS

| | | | | |
|---|---|---|---|---|
| 7,600,905 B2* | 10/2009 | Geiger | ................. | B60Q 1/2665 362/494 |
| 8,882,315 B2* | 11/2014 | Ruiz Ortega | ........ | B60Q 1/2665 362/494 |
| 2014/0321141 A1* | 10/2014 | Bauer | ..................... | F21S 41/30 362/511 |
| 2016/0195230 A1* | 7/2016 | Grosdidier | ............ | F21S 41/151 362/511 |
| 2017/0234501 A1* | 8/2017 | Hanami | ............... | G02B 6/0036 362/511 |

* cited by examiner

*Primary Examiner* — Laura K Tso
(74) *Attorney, Agent, or Firm* — DLA Piper LLP (US)

(57) ABSTRACT

A lamp for an automobile, which includes: a light source; a first light guide unit provided on one side of the light source to face the light source; and a second light guide unit provided on the one side of the light source to face the light source and at least a portion of which is surrounded by the first light guide unit. The first light guide unit includes: a first light guide region which forms one end of the first light guide unit and to which a portion of the light emitted from the light source is incident; and a second light guide region which forms the other end of the first light guide unit and to which another portion of the light emitted from the light source is incident. The second light guide unit is provided between the first and second light guide regions.

17 Claims, 5 Drawing Sheets

# LAMP FOR AUTOMOBILE AND AUTOMOBILE INCLUDING THE SAME

CROSS-REFERENCE TO RELATED APPLICATION(S)

This application claims priority from and the benefit of Korean Patent Application No. 10-2020-0118636, filed on Sep. 15, 2020, which is hereby incorporated by reference for all purposes as if set forth herein.

TECHNICAL FIELD

Exemplary embodiments relate to a lamp for an automobile and an automobile including the lamp and, more specifically, to a lamp for an automobile having a uniform light emitting region and an automobile including the lamp.

BACKGROUND

Lamps for an automobile, which are mounted to the front or rear of the automobile, have lighting images with various shapes according to functions thereof. For example, a lamp for an automobile may have a lighting image with a closed curve shape that includes a circular shape.

In order for the lamp to have the lighting image with such a closed curve shape, a light guide provided in the lamp also needs to have a shape identical or similar to that of the closed curve.

However, in order for the light guide to receive light from a light source, an end of the light guide is required to face the light source. Thus, according to the related art, even in a lamp for an automobile having a lighting image with a closed curve shape, a light guide does not have a complete closed curve shape.

However, according to the related art, due to the light guide not having a complete closed curve shape, a lighting image having a complete closed curve shape is not generated in the lamp for an automobile, and a shadow area is formed in some regions.

SUMMARY

Exemplary embodiments of the present invention provide for manufacturing a lamp for an automobile, which is capable of generating a lighting image having a complete closed curve shape.

A first exemplary embodiment of the present invention provides a lamp for an automobile, the lamp including: a light source configured to emit light; a first light guide unit provided on one side of the light source to face the light source; and a second light guide unit which is provided on the one side of the light source to face the light source and at least a portion of which is surrounded by the first light guide unit, wherein the first light guide unit includes: a first light guide region which forms one end of the first light guide unit and to which a portion of the light emitted from the light source is incident; and a second light guide region which forms the other end of the first light guide unit and to which another portion of the light emitted from the light source is incident, wherein the second light guide unit is provided between the first light guide region and the second light guide region.

The first light guide unit may further include a third light guide region that connects the first light guide region to the second light guide region, wherein at least a portion of the light incident from the light source to the first light guide region and at least a portion of the light incident from the light source to the second light guide region arrive at the third light guide region.

The second light guide unit may be provided to be in contact with the first light guide region and the second light guide region.

The second light guide unit may include: a body part in contact with the first light guide region and the second light guide region; and an extension part extending from the body part toward the third light guide region.

The second light guide unit may further include an emission part which faces the body part with the extension part therebetween and emits at least a portion of the light, which has been emitted from the light source and passed through the body part and the extension part, in a forward direction.

A width of the extension part may be less than a width of the body part.

A width of the emission part may be greater than a width of the body part.

The light source may be provided in plurality, and an area of a region of the plurality of light sources facing the first light guide region and the second light guide region may be greater than an area of a region of the plurality of light sources facing the second light guide unit.

One end of the first light guide region facing the plurality of light sources may have a flat surface shape.

The second light guide unit may further include a light collecting part provided in a region facing the plurality of light sources.

Shapes protruding toward the plurality of light sources may be provided at both ends of the light collecting part in a front-rear direction (A) of the lamp.

A shape protruding toward the plurality of light sources may be provided at a center of the light collecting part in the front-rear direction (A).

Recessed shapes may be provided between the center and both the ends of the light collecting part.

The light collecting part and the emission part may be spaced apart from each other in a front-rear direction (A) of the lamp.

The second light guide unit may be provided with a diagonal region (S) extending diagonally with respect to the front-rear direction (A) and a left-right direction (B) of the lamp.

A region provided on one side of the second light guide unit with respect to the diagonal region (S) may be parallel with a region provided on the other side of the second light guide unit with respect to the diagonal region (S).

The third light guide region may have a circular arc shape.

A second exemplary embodiment of the present invention provides an automobile including a lamp for an automobile, wherein the lamp includes: a light source configured to emit light; a first light guide unit provided on one side of the light source to face the light source; and a second light guide unit which is provided on the one side of the light source to face the light source and at least a portion of which is surrounded by the first light guide unit, wherein the first light guide unit includes: a first light guide region which is provided at one end of the first light guide unit and to which a portion of the light emitted from the light source is incident; and a second light guide region which is provided at the other end of the first light guide unit and to which another portion of the light emitted from the light source is incident, wherein the second light guide unit is provided between the first light guide region and the second light guide region.

A lighting image formed by the light which is emitted forward via the first light guide region or the second light guide region may be continuously connected to a lighting image formed by the light which is emitted forward via the second light guide unit.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for an automobile and the automobile according to the present disclosure will be described with reference to the drawings.

Lamp for Automobile

Figure 1:
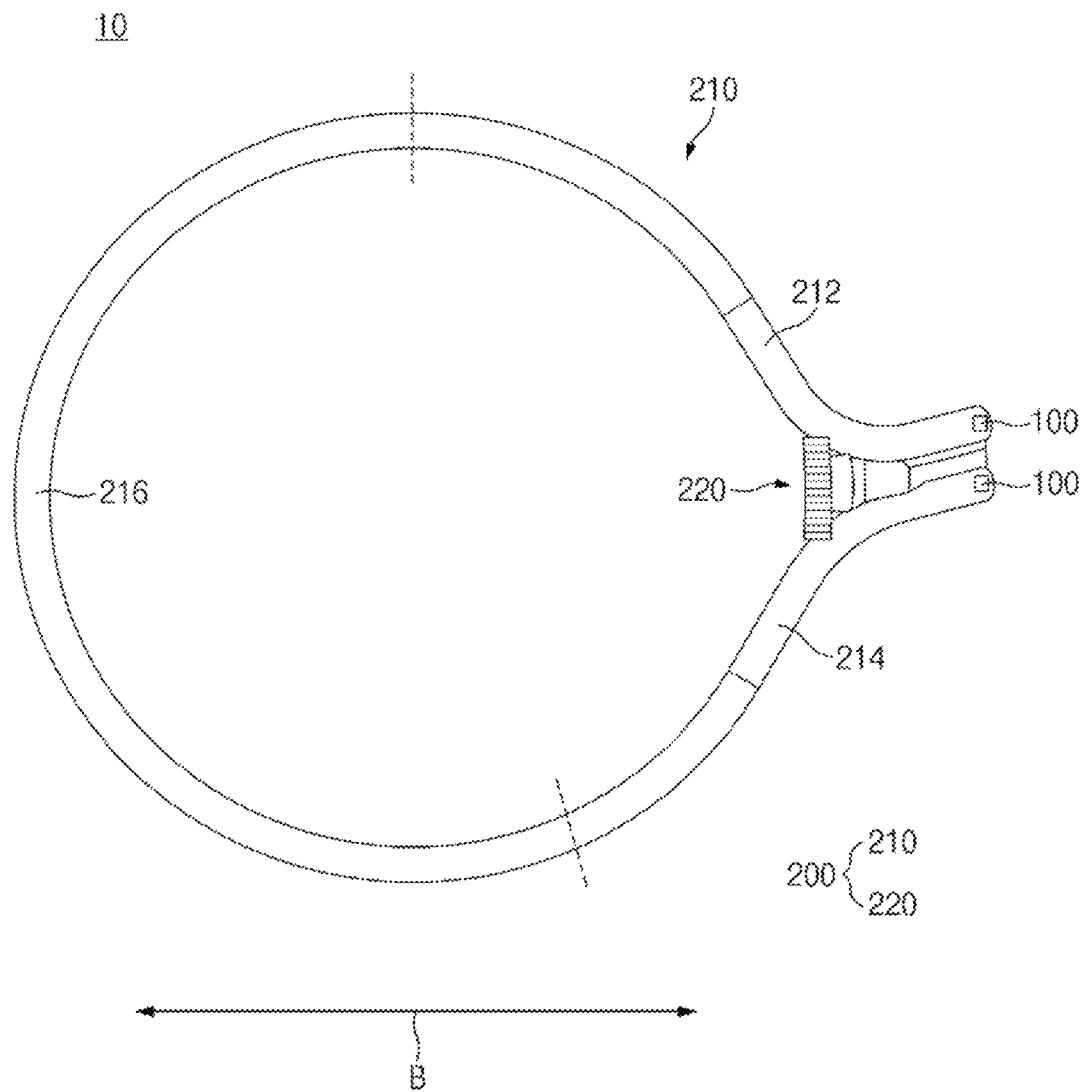
FIG. 1 is a view illustrating a structure of a lamp for an automobile according to the present disclosure.
Figure 2:
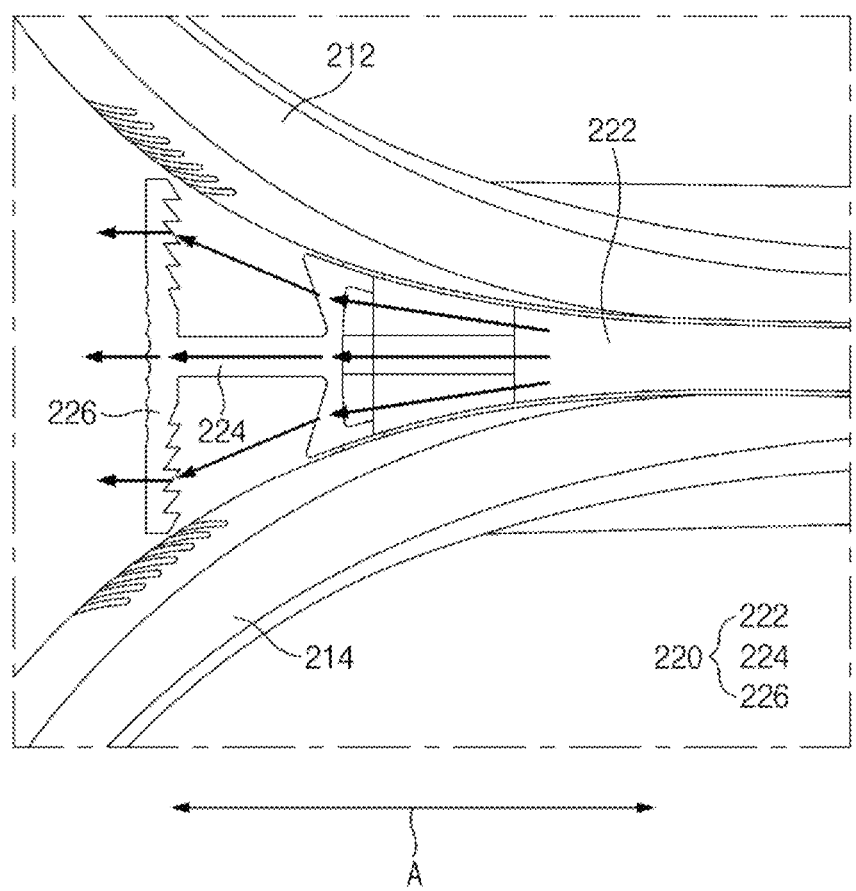
FIG. 2 is an enlarged view illustrating a region in which a first light guide unit meets a second light guide unit in the lamp for an automobile according to the present disclosure.
Figure 3:
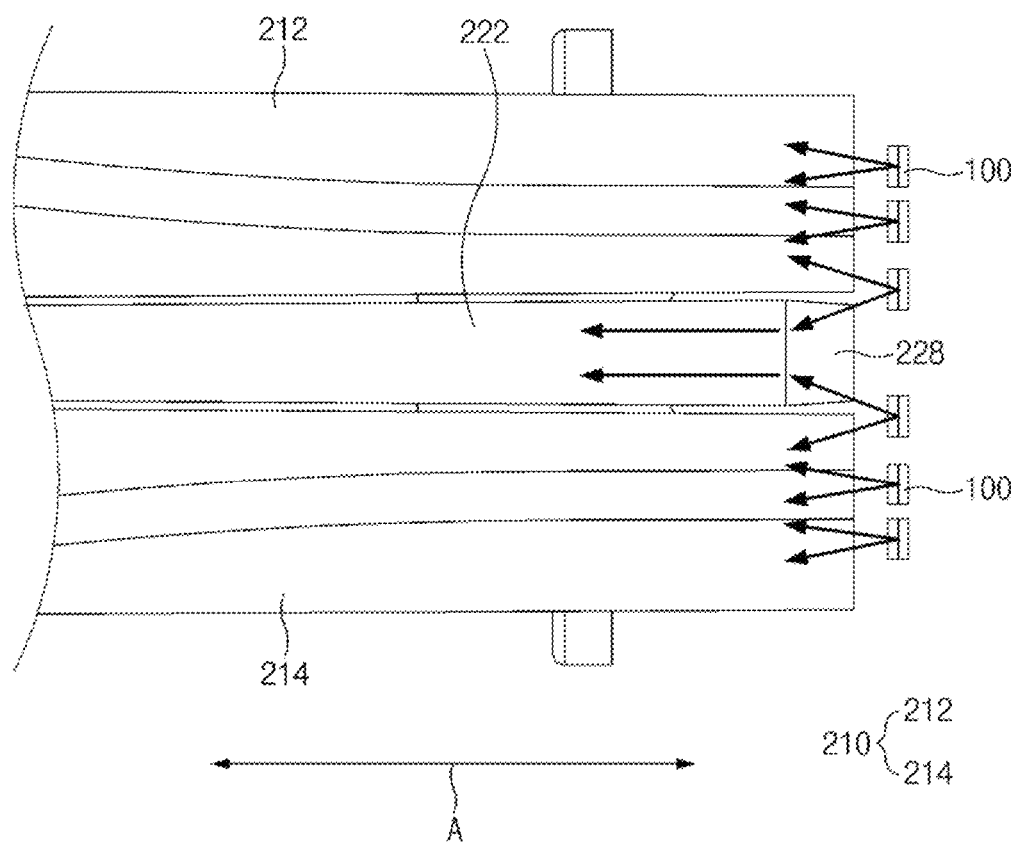
FIG. 3 is an enlarged front view illustrating a state in which the first light guide unit and the second light guide unit face light sources in the lamp for an automobile according to the present disclosure.
Figure 4:
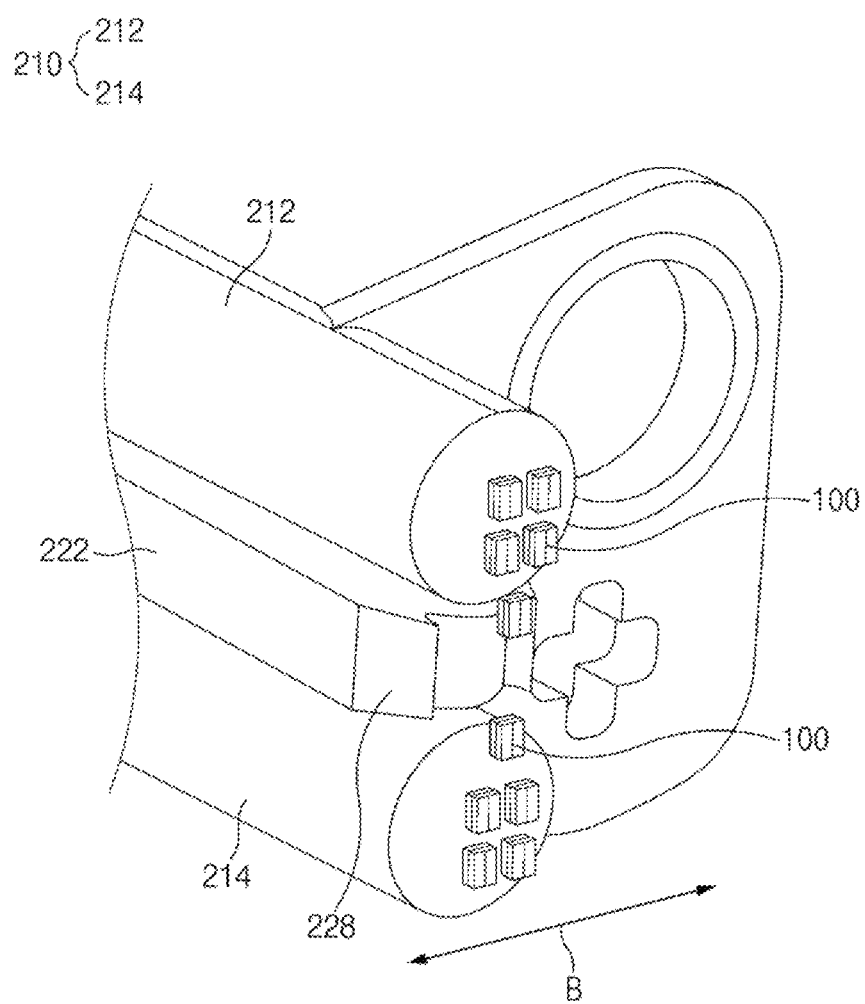
FIG. 4 is an enlarged perspective view illustrating a state in which the first light guide unit and the second light guide unit face the light sources in the lamp for an automobile according to the present disclosure.

FIG. 1 is a view illustrating a structure of a lamp for an automobile according to the present disclosure, and FIG. 2 is an enlarged view illustrating a region in which a first light guide unit meets a second light guide unit in the lamp for an automobile according to the present disclosure. Also, FIG. 3 is an enlarged front view illustrating a state in which the first light guide unit and the second light guide unit face light sources in the lamp for an automobile according to the present disclosure, and FIG. 4 is an enlarged perspective view illustrating a state in which the first light guide unit and the second light guide unit face the light sources in the lamp for an automobile according to the present disclosure.

As illustrated in FIG. 1, a lamp 10 for an automobile (hereinafter, referred to as a 'lamp') according to the present disclosure may include: a light source 100 emitting light; and a light guide unit 200 which is provided facing the light source 100 and into which light emitted from the light source 100 is incident.

More specifically, the light guide unit 200 may include a first light guide unit 210 and a second light guide unit 220 which are provided on one side of the light source 100 to face the light source 100.

The shape of the first light guide unit 210 may be different from the shape of the second light guide unit 220. More specifically, the size of the first light guide unit 210 may be greater than the size of the second light guide unit 220.

The light guide unit 200 including the first light guide unit 210 and the second light guide unit 220 may be configured such that light emitted from the light source 100 is incident to the light guide unit 200 and then moves in an inner space thereof. Then, the light is reflected from an inner wall of the light guide unit 200 and emitted in a forward direction of the lamp 10, thereby generating a lighting image. Here, according to the present disclosure, the lighting image formed by the lamp 10 may have a closed curve shape. More preferably, the lighting image formed by the lamp 10 according to the present disclosure may have a circular shape.

Also, the light emitted from the first light guide unit 210 may form most of the lighting image formed by the lamp 10 of the present disclosure, and the light emitted from the second light guide unit 220 may form a portion of the lighting image by arriving at a region at which the light emitted from the first light guide unit 210 could not arrived.

Continuing to refer to FIGS. 1 and 2, according to the present disclosure, at least a portion of the second light guide unit 220 may be surrounded by the first light guide unit 210. More specifically, the top surface and the bottom surface of the second light guide unit 220 may be surrounded by the first light guide unit 210.

Meanwhile, according to the present disclosure, the first light guide unit 210 may be divided into a plurality of regions. More specifically, the first light guide unit 210 may include: a first light guide region 212 which forms one end of the first light guide unit 210 and to which a portion of the light emitted from the light source 100 is incident; and a second light guide region 214 which forms the other end of the first light guide unit 210 and to which another portion of the light emitted from the light source 100 is incident. For example, the first light guide region 212 may be provided above the second light guide region 214, and the first light guide region 212 and the second light guide region 214 may be spaced apart from each other in the up-down direction.

Here, according to the present disclosure, the second light guide unit 220 is provided between the first light guide region 212 and the second light guide region 214, and thus may be surrounded by the first light guide unit 210. More preferably, the second light guide unit 220 may be provided to be in contact with each of the first light guide region 212 and the second light guide region 214. The second light guide unit 220 may be joined to the first light guide region 212 and the second light guide region 214, or may be coupled, by a separate coupling member, to the first light guide region 212 and the second light guide region 214.

According to the present disclosure, since the first light guide region 212 and the second light guide region 214 are spaced apart from each other in the up-down direction, a so-called shadow area, at which the light emitted from the first light guide 210 to the outside may not arrive, is present between the first light guide region 212 and the second light guide region 214. The second light guide unit 220 provided between the first light guide region 212 and the second light guide region 214 may be configured to remove the shadow area.

Meanwhile, as illustrated in FIG. 1, the first light guide unit 210 may further include a third light guide region 216 that connects the first light guide region 212 to the second light guide region 214. FIG. 1 illustrates a state in which the third light guide region 216 is connected to the left end of the first light guide region 212 and the left end of the second light guide region 214. Also, as illustrated in FIG. 1, the third light guide region 216 may have a circular arc shape.

Meanwhile, in the specification, the first light guide unit 210 is described as being divided into the first to third light guide regions 212, 214, and 216, but this does not represent only a case where the first to third light guide regions 212, 214, and 216 are physically separated from each other. For example, according to the present disclosure, the first to third light guide regions 212, 214, and 216 may be integrally formed.

Meanwhile, similar to the first light guide unit 210, the second light guide unit 220 may be also divided into a plurality of regions. More specifically, as illustrated in FIG. 2, the second light guide unit 220 may include: a body part 222 in contact with the first light guide region 212 and the second light guide region 214; an extension part 224 extending from the body part 222 toward the third light guide region 216 (see FIG. 1); and an emission part 226 which faces the body part 222 with the extension part 224 therebetween.

Here, the widths of the body part 222, the extension part 224, and the emission part 226 in the up-down direction may be different from each other. More specifically, the width of the extension part 224 may be less than the width of the body part 222, and the width of the emission part 226 may be greater than the width of the body part 222.

At least a portion of the light, which has been emitted from the light source 100 and then incident into the second light guide unit 220, arrives at the emission part 226 via the body part 222 and the extension part 224. Subsequently, the light may be reflected from the rear surface of the emission part 226 and emitted forward, thereby forming a portion of a lighting image.

However, another portion of the light, which has been emitted from the light source 100 and then incident into the second light guide unit 220, is emitted to the outside after passing through the inner surface of the body part 222. Subsequently, the light may arrive directly to the emission part 226. Various movement paths of the light in the second light guide unit 220 may be shown by the arrows of FIG. 2.

Meanwhile, a portion of the first light guide unit 210 of the lamp 10 according to the present disclosure may be bent. For example, referring to FIG. 1, the first light guide region 212 and the second light guide region 214 may be bent with respect to the third light guide region 216 in a direction going into the page of the specification. Thus, according to the present disclosure, the first to third light guide regions may be distinguished from each other with respect to bent regions.

Meanwhile, referring to FIGS. 3 and 4, a plurality of light sources 100 may be provided in the lamp 10 according to the present disclosure. FIG. 4 illustrates, as one example, a state in which ten light sources 100 are provided in the lamp 10.

Here, according to the present disclosure, an area of a region of the plurality of light sources 100 facing the first light guide region 212 and the second light guide region 214 may be greater than an area of a region of the plurality of light sources 100 facing the second light guide unit 220. This may be understood as that a relatively larger amount of the light emitted from the plurality of light sources 100 flows in the first light guide unit 210 than the second light guide unit 220.

Meanwhile, according to the present disclosure as illustrated in FIG. 4, one end of the first light guide region 212 facing the plurality of light sources 100 may have a flat surface shape. Similarly, one end of the second light guide region 214 facing the plurality of light sources 100 may also have a flat surface shape. On the other hand, unlike the first light guide region 212 and the second light guide region 214, one end of the second light guide unit 220 facing the plurality of light sources 100 may not have a flat surface shape.

For example, as illustrated in FIG. 4, the second light guide unit 220 may further include a light collecting part 228 provided in a region facing the plurality of light sources 100. The light collecting part 228 may be configured to collect the light emitted from the plurality of light sources 100 and deliver the collected light to the body part 222.

For this, according to the present disclosure, as illustrated in FIG. 4, shapes protruding toward the plurality of light sources 100 may be provided at both ends of the light collecting part 228 in a front-rear direction A of the lamp 10, and a shape protruding toward the plurality of light sources 100 may be provided at a center of the light collecting part 228 in the front-rear direction A. On the other hand, as illustrated in FIG. 4, recessed shapes may be provided between the center and both the ends of the light collecting part 228 in the front-rear direction A of the lamp 10. When the light collecting part 228 has the shape described above, even if a small amount of light emitted from the plurality of light sources 100 arrives at the light collecting part 228, a lighting image having sufficient brightness may be generated.

Figure 5:
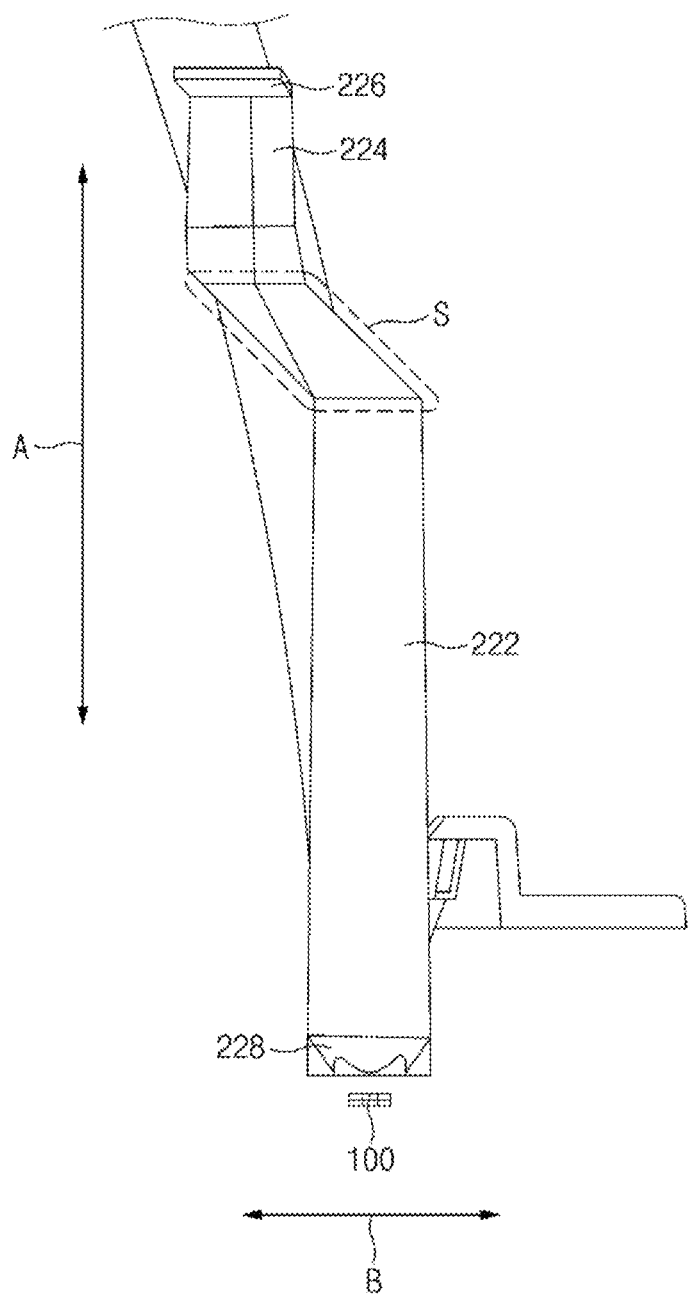
FIG. 5 is a plan view illustrating the entire shape of the second light guide unit in the lamp for an automobile according to the present disclosure.

FIG. 5 is a plan view illustrating the entire shape of the second light guide unit in the lamp for an automobile according to the present disclosure.

As illustrated in FIG. 5, according to the present disclosure, the light collecting part 228 and the emission part 226 of the second light guide unit 220 may be spaced apart from each other in the front-rear direction A of the lamp 10. This may be to prevent the light sources 100 provided to face the light collecting part 228 from being seen from the outside, thereby enhancing the aesthetic impression of the lighting image.

More specifically, the second light guide unit 220 may be provided with a diagonal region S extending diagonally with respect to the front-rear direction A and a left-right direction B of the lamp 10. Here, the diagonal region S may be provided in the body part 222 of the second light guide unit 220.

Also, according to the present disclosure, a region provided on one side of the second light guide unit 220 with respect to the diagonal region S may be parallel with a region provided on the other side of the second light guide unit 220 with respect to the diagonal region S. For example, with respect to the diagonal region S, a direction in which the extension part 224 and the emission part 226 extend may be parallel with a direction in which a region of the body part 222 except for the diagonal region S extends.

Automobile

Referring to FIGS. 1 to 5, an automobile according to the present disclosure may include a lamp 10 for an automobile (hereinafter, referred to as a 'lamp'). The lamp 10 may be provided in the front or rear of the automobile.

The lamp 10 may include: a light source 100 emitting light; a first light guide unit 210 provided on one side of the light source 100 to face the light source 100; and a second light guide unit 220 which is provided on the one side of the light source 100 to face the light source 100 and at least a portion of which is surrounded by the first light guide unit 210.

Also, the first light guide unit 210 may include: a first light guide region 212 which is provided at one end of the first light guide unit 210 and to which a portion of the light emitted from the light source 100 is incident; and a second light guide region 214 which is provided at the other end of the first light guide unit 210 and to which another portion of the light emitted from the light source 100 is incident. Here, according to the present disclosure, the second light guide unit 220 may be provided between the first light guide region 212 and the second light guide region 214.

Meanwhile, according to the present disclosure, a lighting image formed by the light which is emitted to the outside from the first light guide unit 210 of the lamp 10 may be continuously connected to a lighting image formed by the light which is emitted to the outside from the second light guide unit 220. More specifically, according to the present disclosure, a lighting image formed by the light, which is emitted from the light source 100 and then emitted forward via the first light guide region 212 or the second light guide region 214, may be continuously connected to a lighting image formed by the light which is emitted from the light source 100 and then emitted forward via the second light guide unit 220.

According to the present disclosure, the lamp for an automobile, which is capable of generating the lighting image having the complete closed curve shape, may be manufactured.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for an automobile, the lamp comprising:
   a light source configured to emit light;
   a first light guide unit provided on one side of the light source to face the light source; and
   a second light guide unit provided on the one side of the light source to face the light source and at least a portion of which is surrounded by the first light guide unit,
   wherein the first light guide unit comprises:
      a first light guide region which forms one end of the first light guide unit and to which a portion of the light emitted from the light source is incident;
      a second light guide region which forms another end of the first light guide unit and to which another portion of the light emitted from the light source is incident; and
      a third light guide region that connects the first light guide region to the second light guide region,
   wherein the second light guide unit is provided to be in contact with the first light guide region and the second light guide region, and wherein the second light guide unit comprises:
      a body part in contact with the first light guide region and the second light guide region; and
      an extension part extending from the body part toward the third light guide region.

2. The lamp of claim 1,
   wherein at least a portion of the light incident from the light source to the first light guide region and at least a portion of the light incident from the light source to the second light guide region arrive at the third light guide region.

3. The lamp of claim 1, wherein the second light guide unit further comprises an emission part which faces the body part with the extension part therebetween and emits at least a portion of the light, which has been emitted from the light source and passed through the body part and the extension part, in a forward direction.

4. The lamp of claim 1, wherein a width of the extension part is less than a width of the body part.

5. The lamp of claim 3, wherein a width of the emission part is greater than a width of the body part.

6. The lamp of claim 3, wherein the light source is provided as a plurality of light sources, and
   an area of a region of the plurality of light sources facing the first light guide region and the second light guide region is greater than an area of a region of the plurality of light sources facing the second light guide unit.

7. The lamp of claim 6, wherein one end of the first light guide region facing the plurality of light sources has a flat surface shape.

8. The lamp of claim 6, wherein the second light guide unit further comprises a light collecting part provided in a region facing the plurality of light sources.

9. The lamp of claim 8, wherein shapes protruding toward the plurality of light sources are provided at both ends of the light collecting part in a front-to-rear direction of the lamp.

10. The lamp of claim 9, wherein a shape protruding toward the plurality of light sources is provided at a center of the light collecting part in the front-to-rear direction.

11. The lamp of claim 10, wherein recessed shapes are provided between the center and both the ends of the light collecting part.

12. The lamp of claim 8, wherein the light collecting part and the emission part are spaced apart from each other in a front-to-rear direction of the lamp.

13. The lamp of claim 12, wherein the second light guide unit is provided with a diagonal region extending diagonally with respect to the front-to-rear direction and a left-to-right direction of the lamp.

14. The lamp of claim 13, wherein a region provided on one side of the second light guide unit with respect to the diagonal region is parallel with a region provided on another side of the second light guide unit with respect to the diagonal region.

15. The lamp of claim 2, wherein the third light guide region has a circular arc shape.

16. An automobile comprising a lamp for an automobile, wherein the lamp comprises:
   a light source configured to emit light;
   a first light guide unit provided on one side of the light source to face the light source; and
   a second light guide unit provided on the one side of the light source to face the light source and at least a portion of which is surrounded by the first light guide unit,
   wherein the first light guide unit comprises:
      a first light guide region provided at one end of the first light guide unit and to which a portion of the light emitted from the light source is incident;
      a second light guide region provided at another end of the first light guide unit and to which another portion of the light emitted from the light source is incident; and
      a third light guide region that connects the first light guide region to the second light guide region,
   wherein the second light guide unit is provided to be in contact with the first light guide region and the second light guide region, and wherein the second light guide unit comprises:
      a body part in contact with the first light guide region and the second light guide region; and
      an extension part extending from the body part toward the third light guide region.

17. The automobile of claim 16, wherein a lighting image formed by the light which is emitted forward via the first light guide region or the second light guide region is continuously connected to a lighting image formed by the light which is emitted forward via the second light guide unit.

\* \* \* \* \*